May 23, 1944. W. S. GRAHAM 2,349,343
AGRICULTURAL IMPLEMENT
Filed March 3, 1941 3 Sheets-Sheet 1

Inventor
William S. Graham
By Paul O. Pippel
Att'y.

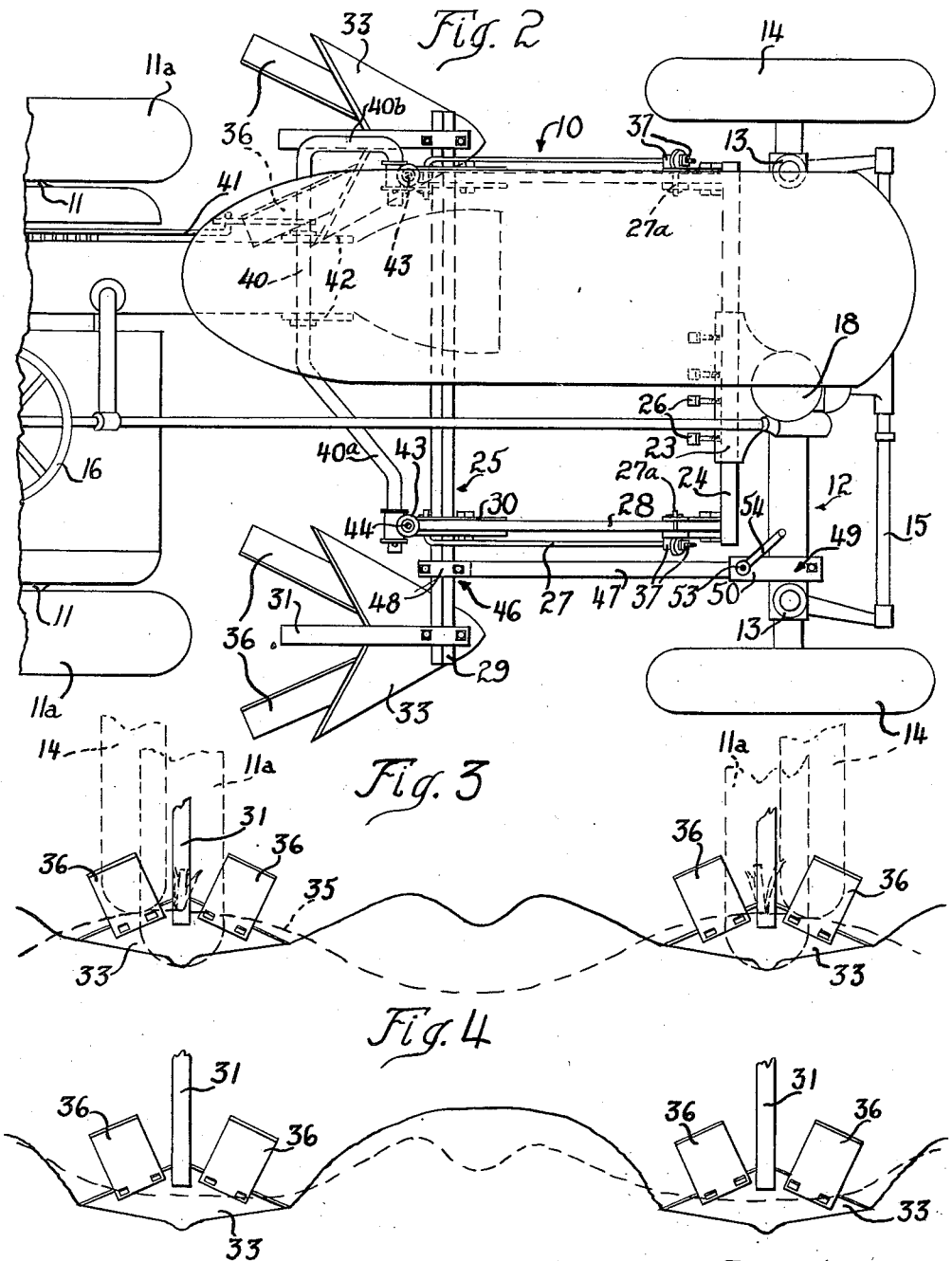

May 23, 1944. W. S. GRAHAM 2,349,343
AGRICULTURAL IMPLEMENT
Filed March 3, 1941 3 Sheets-Sheet 3

Inventor
William S. Graham
By Paul O. Rippel
Atty.

Patented May 23, 1944

2,349,343

UNITED STATES PATENT OFFICE 2,349,343

AGRICULTURAL IMPLEMENT

William S. Graham, Canton, Ill., assignor to International Harvester Company, a corporation of New Jersey Application March 3, 1941, Serial No. 381,475

8 Claims. (Cl. 97—47)

This invention relates to agricultural implements, and more particularly to ground-working implements of a type adapted to be directly connected to a tractor.

With a narrow tread, one row, cultivator type of tractor capable of pulling only one ground-working tool or furrower, usually centrally located on the tractor in rear of the rear wheels and adapted to form a single furrow, difficulty has been experienced in doing a satisfactory furrowing job because the wheels on one side of the tractor running upon the loose dirt thrown up from the previous furrow causes the tractor to tip, affects traction, and makes steering difficult. The cotton or corn stalks when thrown up by these single furrowers are of considerable length and thus not apt to be thoroughly covered by the furrowed dirt.

Also, implement attachments of this type include a working tool or furrower adapted to have movement to and from working position wherein the ground-working tool in its working position is either gauged in that position by means on the tractor or by means associated directly with the working tool for the purpose of gauging the working tool from the ground as the tool passes over the same. If the working tool is connected so as to be gauged directly from the body portion of the tractor, fluctuations of this body portion relative to its forward pivotally connected axle structure will be transmitted to the working tool. As the tractor passes over the ground it has a tendency to sway from one side to the other and to pivot with respect to the forward axle structure. If gauge means is connected directly to the working tool, the same necessarily has to be located near the working tool in order to be effective, and this gauge means would be located in a position immediately ahead of the working tool, but because of lack of space an adequate size gauge wheel could not be provided. Also, there is the disadvantage that slight irregularities will readily be imparted to the working tool since this gauge wheel is only supporting the weight of the working tool and will not depress lumps of dirt and stone so readily.

It is, therefore, an object of the present invention to provide a new arrangement which is particularly adapted for use with this narrow tread type of tractor, whereby the tractor will always be maintained level during a furrowing operation and the wheels will not be caused to run on loose dirt, which so readily affects the steering and traction of the tractor.

It is another object of the invention to provide a furrowing arrangement wherein the cotton or corn stalks will be broken into smaller pieces or portions and thus be more easily covered by the furrowed dirt, and wherein the dirt which is thrown up into beds or ridges will be better pulverized.

It is another object of the present invention to provide a novel means for the gauging of ground-working tools or furrowers wherein movement of the supporting body structure with respect to the forward axle structure will not be imparted to the working tool and wherein slight fluctuations which occur when the working tool is gauged from an individual gauge wheel will not be present.

It is still another object of the present invention to provide an adjustable gauging arrangement adapted to connect the working tool with the forward axle structure of the tractor whereby the working depth can be regulated from and be governed by the pivotal forward axle structure having large steerable wheels.

With the arrangement of the present invention, two furrowers are used, each doing half the work of the single furrow, it being kept in mind that with the average ground conditions the tractor is not sufficiently powered to pull two furrowers doing full work. The arrangement makes two trips across the field at different depths and the furrow is complete after the second furrowing operation, which takes place in the furrow formed by the first furrowing operation. The furrowers are located immediately ahead of the rear traction drive wheels of the narrow tread type of tractor where these wheels are spaced about the width of the average crop row, either on beds or in furrows. These drive wheels thus run in the furrows and not on any loose dirt thrown up from a previously formed furrow, and thus they have better traction. By causing the furrowers to pass over the field twice, the corn stalks are thus cut into smaller pieces, one piece being taken during the first operation while the final piece of the corn stalk is uprooted from the ground during the second furrowing operation.

Also, there has been provided a connection means adapted to extend from the working tool to the pivotable forward axle structure whereby the location of the working tool in its working position will be governed from the pivotal forward axle structure. This connection means includes an adjustable means whereby the working depth of the working tool can be predetermined. This adjustable means takes the form of an adjustable stop carried by a vertically extending threaded rod which extends through a bracket on the forward axle structure.

For other objects and for a better understanding of the invention, reference may be had to the following detailed description taken in connection with the accompanying drawings, in which:

Figure 2 is a plan view of the tractor shown in Figure 1 and of the implement attachment embodying the present invention connected to the same;

Figure 3 is an illustration of the ground after the working tools have passed through for the first operation;

Figure 4 is a view similar to Figure 3, showing the ridges and furrows completely formed and after the working tools have passed over it for the second and final operation;

Figure 1:
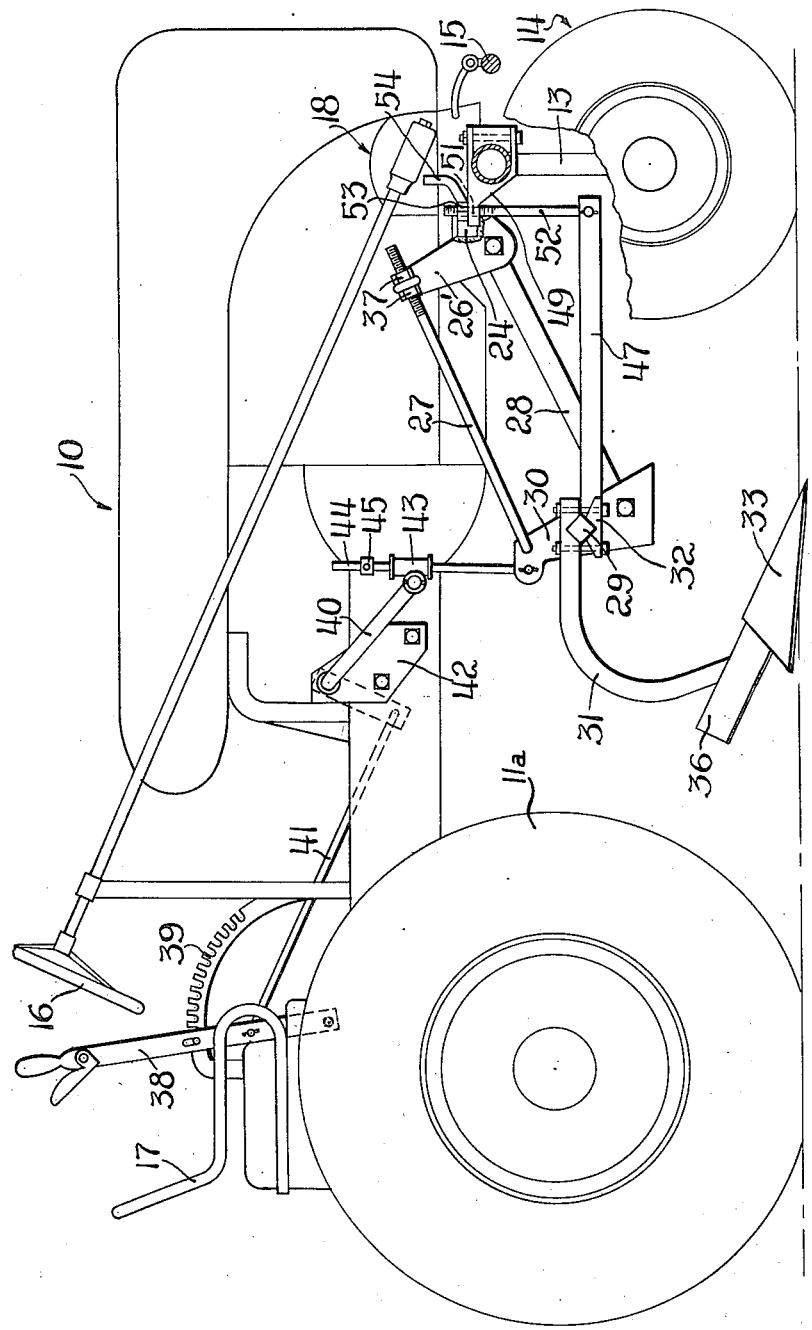
Figure 1 is an elevational view of a tractor having the implement attachment embodying the present invention directly connected thereto.

Referring now particularly to Figures 1 and 2, there is shown a tractor having a longitudinally extending main body frame or portion 10, a rear axle structure 11 having rear traction or drive wheels 11a, and a forward axle structure 12 pivotally connected to the longitudinal body portion 10. The forward axle structure 12 extends beyond the sides of the main body or frame portion 10 of the tractor and has connected thereto, by means of vertical spindles 13, a pair of steerable wheels 14 adapted to be operated by steering mechanism 15 including a steering wheel 16 located near to an operator's station 17 on the rear axle structure 11 of the tractor.

Figure 5:
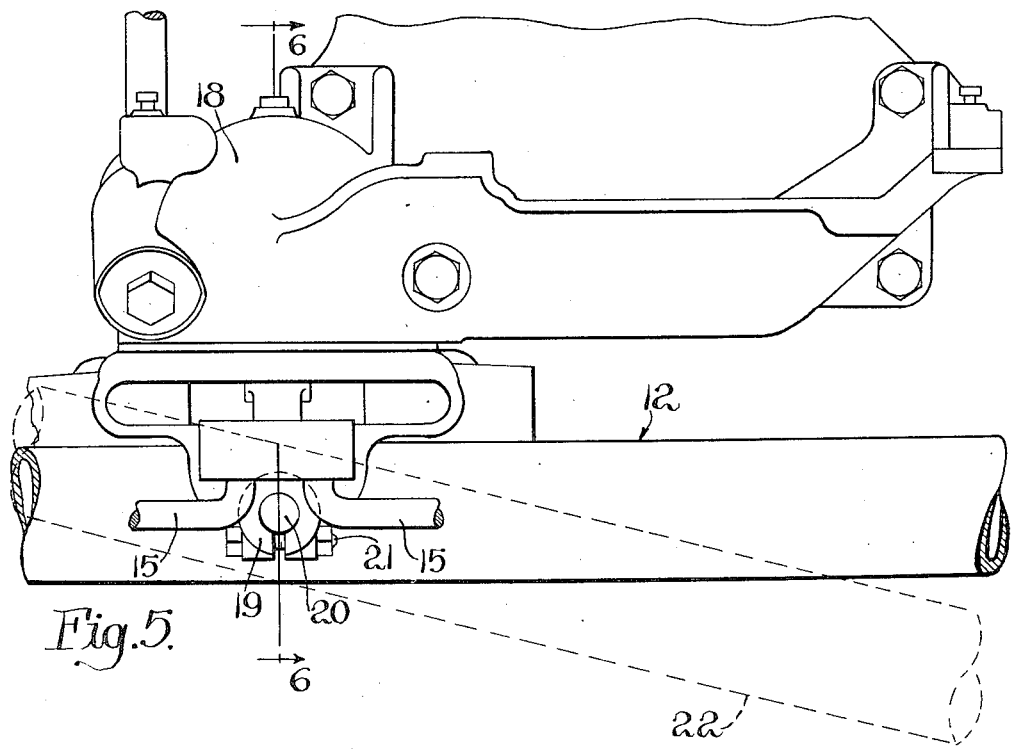
Figure 5 is an enlarged detail view in elevation of the forward end of the tractor and illustrating the pivotal connection of the forward axle structure thereto; and, Figure 6 is an enlarged detail view taken along the line 6—6 of Figure 5 and showing in section the trunnion connection of the axle structure to the body portion of the tractor.
Figure 6:
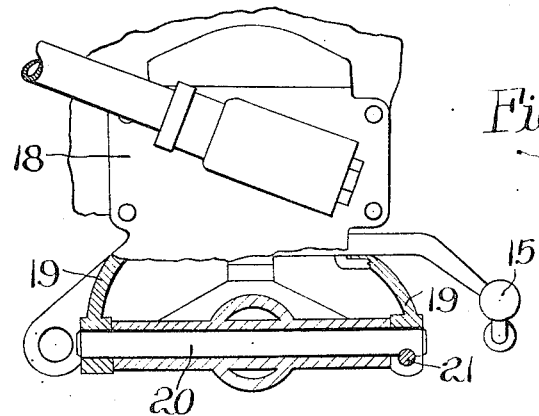

Referring now particularly to Figure 5, there is shown as forming a part of the body portion 10 a bolster structure 18 having a depending bracket structure 19 in which is pivoted a trunnion 20 extending longitudinally of the tractor and retained therein by means of a bolt 21. The trunnion 20 forms a part of the axle structure 12 and as the tractor traverses unlevel ground it should be apparent that this axle structure may at times assume a position indicated at 22 in dotted lines in Figure 5 which is at an angle with respect to the bolster structure 18 and with the remaining part of the tractor. Because of this pivot connection of the axle structure it will be apparent that the remaining part of the tractor pivots with respect to the forward axle structure thereby leaving the axle structure and wheels 14 to follow the natural contour of the ground.

Associated with the bolster structure 18 is a bracket structure 23 adapted for the connection to the tractor of an implement attachment. This bracket structure has a laterally extending opening preferably square in cross-section for receiving attaching pieces 24 of an implement attachment means indicated generally at 25. These portions 24 are retained within the opening in the bracket structure by clamping screws 26.

The attaching pieces 24 include vertically extending portions 26' to which are pivotally connected upper and lower parallel links 27 and 28. The upper link 27 is connected to the vertically extending portion 26' by means of a transversely extending eye-bolt 27a. The upper end of the link passes through the eye-bolt and is retained therein by adjusting nuts 37. There is located on each side of the tractor a pair of such parallel links. To the rearward ends of these parallel links is connected a tool bar 29 of square cross-section, the connection being made by means of bracket structures 30 rigidly carried on the tool bar 29. This tool bar extends beneath the tractor and projects to locations removed from the sides of the tractor. On the outer ends of this tool bar 29 is respectively connected a tool beam 31 by means of clamping elements 32. On the lower end of each tool beam 31 is connected a ground-working tool or furrower 33. The working tool 33 can be more readily identified as a sweep normally used for plowing off from the tops of previously prepared ridges. By using such tools here, it is possible to prepare two furrows with a tractor having only sufficient power to normally pull a regular furrower bottom. These furrowers are spaced the same distance apart as the rear traction wheels which is the width of the spacing between the old ridges containing the corn or cotton stalks.

As the tractor with the sweeps 33 furrow the ground for the first time, dirt will be thrown up as shown in Figure 3, the ground having originally had the contour indicated by the dotted line 35. A portion of the cotton or corn stalks will be cut off during this first furrowing operation. It will be noted from Figure 3 that the furrows formed as a result of the first operation over the field do not have any great depth. To obtain depth of the furrows such as regularly obtained with regular single furrowers, the tractor traverses the field a second time whereupon the sweep bottoms 33 will throw up the dirt and the remaining portions of the cotton or corn stalks and new ridges of the height indicated in Figure 4 are formed. It will be noted that during each operation the traction wheels follow in the furrow. By always traveling in the furrow, the tractor will always remain level and have good traction. The forward steerable wheels are spaced slightly farther apart than the rear traction wheels 11a. This allows the wheels to clear the portion of the corn stalk above the ground so that the steering of the tractor during the first furrowing operation is not encumbered. The forward wheels are not spaced so far apart but what they can run in the furrow formed during the first operation. The sweeps 33 each have a pair of moldboards 36. If it is desired to level the sweep bottoms 33 this is accomplished by adjusting adjusting nuts 37 on the upper link 27 at the point of its connection with the vertically extending plate structure 26'.

When it is desired to raise the working tools to the transport position, a hand lever 38 is drawn over a quadrant 39. The lever 38 is located near the operator's station 17 and is connected to a rockable structure 40 by means of a link 41. The rockable structure 40 is connected intermediate the ends of the tractor by means of a bracket structure 42 in which the rockable structure is journaled. The rockable structure 40 has a pair of lifting arms 40a and 40b extending forwardly and located respectively at each side of the tractor for connection to a lifting collar 43 through which extends a lifting rod 44. As the rockable structure is rotated in a counterclockwise direction the lifting collar 43 will engage with a stop collar 45 on the lifting rod 44 and upon continued movement thereof, the transverse bar 29 and the working tools 33 will be lifted out of their ground-working or furrowing positions. The lift rods 44 are connected respectively to the bracket structures 39 on the tool bar 29. In the ground-working or furrowing position the working tools 33 are free to float up and down but due to their weight and their suction into the ground they will not come out of the ground to any great extent.

There is connected to the tool bar 29 at 46 a forwardly extending member 47. This member 47 is rigidly clamped to the tool bar at 46 by clamping means 48. On the forward axle structure 12 is rigidly connected a bracket structure 49 having a rearwardly extending portion 50 with an opening 51 therethrough. Through this opening 51 is projected a vertically extending threaded rod 52 connected at its lower end to the forwardly extending member 47. On the upper end of this rod 52 is threadedly connected an adjustable stop element 53 which may take the form of a winged nut having a wing or handle portion 54. When the working tools or furrowers 33 and the transverse bar 25 are located in their furrowing positions, the same will be supported entirely from the bracket structure 50 and consequently from the forward axle structure 12. It should thus be apparent that the working tools 33 will not be affected by any lateral sway of the tractor body portion 10 but will be directly gauged from the forward axle structure 12 and from the large wheels 14 thereon. In other words, the wheels 14 of the pivotal forward axle structure 12 will serve as gauge wheels for the working tools during the working operation and additional gauge wheels for attachment to the individual tools are not necessary.

When it is desired to vary the working depth of the tillage tools, the wing nut 53 may be adjusted so as to permit the working tools to have a greater or less working depth. In cases where the soil is loose and easy to handle the tools could be adjusted to a greater depth and the one furrowing operation might suffice. It will now be apparent that by means of the forwardly extending member 47, the link 52, and the bracket structure 49, there has been provided an improved connection means between the working tool and the forward axle structure, and that by virtue of the threaded portions of the link 52 and the winged nut 53 there has been provided means for adjusting the working depth of the working tools.

While various changes may be made in the detail construction of the present invention, it should be apparent that such changes shall be within the spirit and scope of the present invention as defined by the appended claims.

What is claimed is:

1. In combination, a tractor having a longitudinally extending body portion and a forward axle structure pivotable in a transverse plane with respect to the body portion, wheel means associated with the axle structure, a ground-working implement structure connected to the body portion of the tractor and including a transversely extending ground-working tool located rearwardly of the forward axle structure, means for connecting the ground-working tool to the tractor body portion for vertical movement with respect thereto in its ground-working position, and means separate from the tool-connecting means for connecting the working tool to the axle structure for gauging the working depth thereof, whereby the working depth of the working tool will be governed by the pivotable forward axle structure, and means associated with said forward axle structure for adjustably setting the working tool with respect to the axle structure for various depths.

2. In combination, a tractor having a rear axle structure and a transversely pivotable forward axle structure, a transversely extending tool-carrying bar located beneath the tractor and extending beyond the sides thereof, means for connecting the tool-carrying bar to the tractor for vertical movement, working tools fixed to the tool-carrying bar to be located intermediate the rear axle and forward axle structure and at the respective sides of the tractor, and means separate from the tool-carrying bar connecting means for connecting the tool-carrying bar with the forward axle structure for gauging the vertical position of the working tool during its working operation.

3. In combination, a tractor having rear traction wheels spaced apart the distance of a crop row, and a forward wheel axle structure vertically pivotable with respect to the rear traction wheels, ground furrowers located respectively in front of the traction wheels and extending transversely of the tractor, means for connecting the furrowers to the tractor for vertical movement with respect thereto, means separate from the furrower connecting means for connecting the furrowers to the forward wheel axle structure to be gauged by the same when in their furrowing position, said separate connecting means including means for adjusting the furrowers with respect to the forward wheel axle structure for different furrowing depths.

4. In combination, a main frame, an axle structure pivotally connected to the main frame for movement in a transverse plane, wheel means associated with the axle structure, an implement structure connected to the main frame and including a working tool spaced from said axle structure, means for connecting the working tool to the main frame for free vertical movement bodily in its working position, and means separate from the connecting means of the working tool with the main frame for connecting the working tool to the axle structure at a location removed from the latter's pivotable connection with the main frame for gauging the position of the working tool by the axle structure.

5. In combination, a tractor having a longitudinally extending body portion and a forward axle structure laterally pivotable in a transverse plane with respect to the body portion and extending laterally from the sides thereof, an implement structure spaced from said axle structure and connected to the body portion of the tractor and including a working tool, means for connecting the working tool to the body portion for free vertical movement bodily in its working position, and means separate from the working-tool connecting means for connecting the working tool with the forward axle structure for gauging the position of the working tool by the forward axle structure.

6. In combination, a tractor having a longitudinally extending body portion and a forward axle structure pivotable in a transverse plane with respect to the body portion, wheel means associated with the axle structure, a ground-working implement structure connected to the body portion of the tractor and including a transversely extending ground-working tool located rearwardly of the forward axle structure and spaced therefrom, means for connecting the ground-working tools to the tractor body portion for free vertical movement bodily in its ground-working position, and means separate from the tool-connecting means for connecting the working tool to the axle structure for gauging the working depth, whereby the working depth of the working tool will be governed by the pivotable forward axle structure.

7. In combination, a tractor having a main body portion and an axle structure pivotally connected to the main body portion for movement in a transverse plane, a transversely extending tool-carrying bar, means for connecting the tool-carrying bar to the tractor main body for free vertical movement bodily with respect thereto, a working tool fixed to the tool-carrying bar, and means separate from the tool-carrying bar connecting means for connecting the tool-carrying bar to the axle structure for gauging the vertical position of the working tool during its working operation.

8. In combination, a tractor having rear traction wheels spaced apart the distance of a crop row, and a forward wheel axle structure vertically pivotable with respect to the rear traction wheels, ground furrowers located respectively in front of the traction wheels and extending transversely of the tractor, means for connecting the furrowers to the tractor for free vertical movement bodily with respect thereto, and means separate from the furrower connecting means for connecting the furrowers to the forward wheel axle structure for gauging the same when in their furrowing position.

WILLIAM S. GRAHAM.